United States Patent Office 2,877,197
Patented Mar. 10, 1959

2,877,197

LIQUID COATING COMPOSITION COMPRISING A POLYTHIOL POLYMER, A METALLIC DRIER, AN AMINE, AND A SOLVENT THEREFOR

Earl Eugene Fisher, New Castle, Del., assignor to E. I. du Pont de Nemours and Company, Wilmington, Del., a corporation of Delaware No Drawing. Application February 16, 1955
Serial No. 488,715

18 Claims. (Cl. 260—29.2)

This invention relates to coating compositions comprising polythiol polymers and more particularly to synergistic drier or accelerator compositions for curing such coating compositions at average atmospheric temperatures or at low baking temperatures.

Polythiol (polymercaptan, polyhydrosulfide) polymers and polysulfide polymers containing a plurality of thiol substituents, of which the commercially available "Thiokols" are representative, are well known for their resistance to organic liquids and corrosive chemicals. These properties of the polythiol polymers make them particularly attractive as film-forming components in protective coating compositions. Metal salt driers are known to cure polythiol polymers at average atmospheric temperature (e. g. 50°–90° F.) in a reasonable time, i. e. a few hours, but effective concentrations result in coatings having an objectionable amount of color. Thus, such polythiol coating compositions cannot be used where substantially colorless clear coatings or clean colored (e. g. white) coatings are required. A further disadvantage is that liquid polythiol coating compositions which contain enough metallic drier to cure rapidly at average atmospheric temperatures frequently body or gel at such a rapid rate, even in air-tight containers, that they must be used immediately or within a very few hours after the drier is added. Still a further disadvantage is that localized gelation and/or localized deep color formation frequently occurs when metallic drier is added to a liquid polythiol coating composition, even though the amount of drier is insufficient to cause bad discoloration uniformly throughout the composition if added under more favorable conditions.

It is an object of this invention to provide liquid coating compositions comprising a polythiol polymer which dry rapidly in air at average atmospheric temperatures or at low baking temperatures. Another object is to provide such liquid coating compositions which may be stored in air-tight containers for long periods of time without gelling or bodying to an unusable condition. Still another object is to provide such coating compositions which are lighter in color than prior art coating compositions containing a polythiol polymer and enough metallic drier to impart equal drying properties.

A further object is to provide such polythiol polymer coating compositions which are substantially free of localized gelation and/or localized deep color. A still further object is to provide a synergistic drier or accelerator composition which imparts rapid drying properties to such polythiol polymer coating compositions without imparting an objectionable amount of color thereto.

These and other important objects are accomplished by providing liquid coating compositions comprising a solution in a volatile organic liquid of (1) a polythiol polymer having at least three reactive thiol groups per molecule, (2) a metallic drier compound in an amount corresponding to 0.005%–2.0% of metal based on the weight of said polymer, and (3) 0.1%–5.0%, based on the weight of said polymer, of a basic amino nitrogen compound having 1–5 amino nitrogen atoms and 2–20 carbon atoms per molecule, said amino nitrogen compound being a member of the group consisting of alkyl primary and secondary amines, alkanol primary and secondary amines, N-alkyl N-alkanol tertiary amines, alkenyl primary and secondary amines, alkylene primary and secondary amines, cycloalkyl primary and secondary amines, aralkyl amines, N-aryl guanidines, morpholine, N-alkyl morpholines, dimethyl formamide, N,N'-disalicylalethylenediamine and N,N'-disalicylalorthophenylenediamine.

The synergistic drier or accelerator compositions of this invention are mixtures, or solutions of mixtures, of the above-defined components (2) and (3), i. e. metallic drier compound and basic amino nitrogen compound.

The metallic drier compounds intended in the above-defined component (2) are the well known soluble derivatives which are commonly added to paints and varnishes to impart air-drying properties thereto. Suitable metals are, for example, manganese, iron, cobalt, copper, nickel, chromium, zinc, cerium, lead, calcium, aluminum, titanium, zirconium, and magnesium. They may be used, for example, as the chlorides, acetates, hydrates, oxhydrates, octoates, oleates, linoleates, naphthenates, resinates and the chelate derivatives of dicarbonyl compounds capable of keto-enol tautomerism, such as beta-diketones, beta-ketoacids, and beta-ketoacid esters.

Examples of the basic amino nitrogen compounds having 1–5 amino nitrogen atoms and 2–20 carbon atoms intended in the above-defined classes of component (3) are:

Alkyl primary and secondary amines—
    Ethyl amine, isopropyl amine, butyl amine, diethyl amine, diisopropyl amine, hexyl amine, acetamidine, butyramidine.

Alkanol primary and secondary amines—
    Ethanol amine, diethanol amine, isopropanol amine, 2-amino 2-ethyl propanol-1.

N-alkyl N-alkanol tertiary amines—
    Methyl diethanol amine, diethyl ethanol amine.

Alkenyl primary and secondary amines—
    Allyl amine, methallyl amine, diallyl amine.

Alkylene primary and secondary amines—
    Ethylene diamine, hexamethylene diamine, diethylene triamine, triethylene tetramine, tetraethylene pentamine.

Cycloalkyl primary and secondary amines—
    Cyclohexyl amine, piperidine.

Aralkyl amines—
    Benzyl amine, dibenzyl amine, ortho dimethylaminomethyl para octyl phenol, ortho dimethylaminomethyl para butyl phenol.

N-aryl guanidines—
    Diphenyl guanidine, triphenyl guanidine.

N-alkyl morpholines—
    Methyl morpholine, ethyl morpholine.

The following examples illustrate the principles and practice of this invention, but it is not limited thereby. Unless otherwise specified the parts and percentages are by weight.

*Example 1*

A coating composition of this invention was prepared by adding and mixing the following ingredients in the order listed:

|                                                      | Parts by wt. |
|------------------------------------------------------|--------------|
| Cyclohexanone                                        | 20           |
| Toluene                                              | 15           |
| Polythiol polymer, "Thiokol" LP-2                    | 50           |
| 10% diphenyl guanidine in cyclohexanone              | 10           |
| Manganese chelate of acetyl acetone in cyclohexanone, 1% Mn | 5     |
|                                                      | 100          |

The polythiol polymer "Thiokol" LP-2 was a liquid polysulfide polymer having more than three terminal and side chain thiol groups per molecule, an average molecular weight of about 4000, and a viscosity of about 450 poises. The structure of its average molecule is

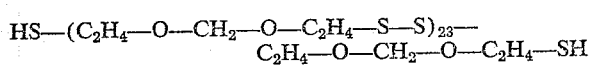

with an occasional side chain thiol group and a minimum of about 0.025 thiol groups per carbon atom in the polymer chain.

In this composition the manganese chelate was present in an amount corresponding to 0.1% Mn based on the weight of the polythiol polymer, and the diphenyl guanidine was present in an amount corresponding to 2.0% on the same basis.

The resulting liquid coating composition was free of gel and was also free of objectionable color resulting from the added manganese compound. It did not gel or body to an unusable condition when stored in a full air-tight can.

When applied to a non-porous surface like a glass or steel panel at a dry film thickness of about 1 mil, the coating composition of this example dried or cured to a chemical and solvent resistant state in about 24 hours at a room temperature of about 75° F. The resulting coating was clear and practically colorless.

By comparison, a prior art product containing no diphenyl guanidine, but otherwise having the same composition, did not cure to a chemical and solvent resistant state under the same conditions.

Another analogous prior art composition containing no diphenyl guanidine but containing 0.4% manganese, as manganese naphthenate, in place of the chelate in the above formula likewise did not cure. In fact, the temperature had to be raised to about 150° F. to effect an equal cure. The resulting coating was objectionably dark in color.

Other analogous prior art compositions were prepared which contained no diphenyl guanidine but which contained 0.1% and 0.2% respectively of cobalt, as cobalt naphthenate, in place of the chelate in the above formula. A 1 mil coating of the one containing 0.2% cobalt cured to a chemical and solvent resistant state in about 30 hours at about 75° F., but was objectionably dark in color. The one containing 0.1% cobalt required heat to cure it and was also objectionable in color. Both liquid products bodied to an unusable condition during storage.

For the purpose of preparing additional coating compositions of this invention, the manganese chelate in the formula provided above was replaced, in four separate compositions, with 0.1% cobalt as a chelate of acetyl acetone, 0.02% iron as a similar chelate, 0.1% copper as a chelate of butyl acetoacetate, and 0.1% copper as cupric chloride. All of these products had substantially the same properties as the product defined by the original formula.

In two other coating compositions of this invention, similar improvements over the prior art were obtained by substituting morpholine and triphenyl guanidine, on an equal weight basis, for the diphenyl guanidine in the original formula.

Example 2

A coating composition of this invention was prepared by adding and mixing the following ingredients in the order listed:

|                                               | Parts by wt. |
|-----------------------------------------------|--------------|
| Dimethyl formamide                            | 45           |
| Polythiol polymer, "Thiokol" LP-2             | 50           |
| Manganese acetate in dimethyl formamide, 1% Mn| 5            |
|                                               | 100          |

In this composition the manganese salt was present in an amount corresponding to 0.1% manganese based on the weight of the polymer. The amino nitrogen compound, dimethyl formamide, acted both as an activator and a volatile solvent, the amount in excess of 5% based on the weight of the polymer being considered as solvent.

The resulting composition had properties substantially equal to the product of the original formula provided in Example 1.

A modification of the product of Example 2 was prepared by substituting for the manganese acetate-dimethyl formamide solution an equal amount of a solution containing 0.1% manganese as manganese chloride in diethylene glycol monoethyl ether. The resultnig modification had properties substantially equal to the original product.

Example 3

Another coating composition of this invention having the following formula was prepared as previously described:

|                                                      | Parts by wt. |
|------------------------------------------------------|--------------|
| Cyclohexanone                                        | 36           |
| Polythiol polymer                                    | 40           |
| 10% diphenyl guanidine in cyclohexanone              | 4            |
| Manganese chelate of acetyl acetone in cyclohexanone, 1.0% Mn | 20  |
|                                                      | 100          |

The polythiol polymer was a copolymer of 83 percent by weight methyl methacrylate and 17 percent vinylthiol, having a number average molecular weight of about 25,000 and containing about 0.127 thiol groups per carbon atom in the polymer chain.

This coating composition contained 0.5% manganese and 1.0% diphenyl guanidine based on the weight of the polymer.

The liquid coating composition was free of gel and was also free of objectionable color resulting from the added manganese compound. It did not gel or body to an unusable condition when stored in a full air-tight can.

A coating of this composition applied to glass, wood and metal substrates at a dry thickness of 1 to 2 mils cured in 24 hours at room temperature to a solvent resistant film.

Another composition of this invention made on the above formula but using only half of the specified amount of the manganese chelate cured satisfactorily when baked at 250° F.

A third composition made on the above formula but substituting an equal weight of triethylenetetramine for diphenyl guanidine had properties substantially equal to the original formula.

A prior art product containing no diphenyl guanidine but otherwise the same as the original formula did not cure at room temperature.

Example 4

Using a solution of the polythiol polymer of Example 3 containing 1.0% manganese as the chelate of acetyl acetone, eleven additional compositions of this invention were prepared by adding to separate portions of this solution one of eleven different amino nitrogen compounds in the amount of two mols per mol of manganese chelate. Each of these compositions cured faster than an analogous one containing no amino nitrogen compound. The accelerating effect of each amino nitrogen compound was compared with the others, and the compounds were found to fall in the following order of descending effect:

N,N'-disalicylalethylenediamine
Piperidine
Diphenyl guanidine
Morpholine
Diisopropylamine
Methyl diethanolamine
Triphenyl guanidine
Otho dimethylaminomethyl para octyl phenol
Ortho dimethylaminomethyl para butyl phenol
N-methyl morpholine
Dimethyl formamide Although their accelerating effects do not necessarily fall in the same order when used with other dried metals, all of the amino nitrogen compounds listed above accelerate the drying of similar compositions which use other metallic drier compounds in place of the manganese chelate of this example.

*Example 5*

In another experiment to compare the accelerating effects of various amino nitrogen compounds, thirteen such compounds were tested in coating compositions made from a 45% solution in toluene of a polythiol polymer. The solution also contained 0.2% of manganese as manganese octoate. The amino nitrogen compounds were used as 10% solutions in dioxane and were added in amounts corresponding to 4 mols of amino nitrogen compound per mol of manganese octoate.

The polythiol polymer was prepared by treating a liquid homopolymer of butadiene-1,3 having a molecular weight of about 1500 and a Gardner-Holdt viscosity of A-1 (50% in mineral spirits) with thiolacetic acid in an amount sufficient to incorporate in the polymer an average of about 0.6 mol of thiolacetic acid per $C_4$ unit and by subsequently subjecting the resulting product to methanolysis. The final polymer was thus a butadiene homopolymer having side chain thiol groups and containing about 0.15 thiol groups per carbon atom in the polymer chain.

Each of the coating compositions prepared in this experiment cured faster than one which contained the polymer and manganese drier but no amino nitrogen compound. The accelerating effect of each amino nitrogen compound was compared with the others, and the compounds were found to fall in the following order of descending effect:

Diphenyl guanidine
N,N'-disalicylalethylenediamine
Butyl amine
Morpholine
Allyl amine
Cyclohexyl amine
Benzyl amine
Tetraethylene pentamine
Isopropyl amine
N,N-disalicylalorthophenylenidiamine
Diethyl amine
Ethylene diamine
Diisopropyl amine The other metallic drier compounds of this invention may be substituted for the manganese octoate used in this example to produce coating compositions of this invention, but when such is done the amino nitrogen compounds do not necessarily fall in the same order of accelerating activity.

Typical examples of other polythiol polymers containing at least three thiol groups per molecule which may be substituted for all or part of the polymers in the examples are methanolysis products of vinyl thiolacetate homopolymers and copolymers thereof with at least one ethylenically unsaturated monomer copolymerizable therewith, such as ethyl acrylate, methylacrylate, methyl methacrylate, butyl methacrylate, acrylonitrile and vinyl acetate; thiolcarboxylic acid esters of epoxide-containing polymers and copolymers, e. g. such an ester of the epoxy polyhydroxy polyether resin resulting from the condensation of epichlorohydrin with diphenylolpropane, and such an ester of a vinyl acetate/allylglycidyl ether copolymer or a styrene/glycidyl methacrylate copolymer; methanolysis products of polythiolacetates resulting from the addition of thiolacetic acid to unsaturated polymers such as butadiene polymers and copolymers; polyesters of thioldicarboxylic acids such as mercaptosuccinic acid; and polyesters of other thiol-containing compounds such as the monoglyceride of mercaptoacetic acid. These polymers contain a maximum of 0.5 thiol groups per carbon atom in the polymer chain, as exemplified by a homopolymer of vinyl thiol, the methanolysis product of vinyl thiolacetate.

Although in the examples the polythiol polymer was present in the amount of 40–50% of the total composition, it will be obvious to those skilled in the organic coating art that other amounts may be used, e. g. 10%–80%, the minimum amount depending mainly on having enough present to provide a coating of reasonable thickness and the maximum amount depending on the solubility of the polymer in the desired solvent and obtaining a suitable viscosity.

While the synergistic accelerator compositions of this invention will accelerate the drying of polymers having one or two thiol groups per molecule, the resulting coatings are not chemical and solvent resistant enough to be broadly useful. The polythiol polymers which are useful in the practice of this invention contain at least three thiol groups per molecule, preferably more than three.

While the amount of metallic drier compound used may be 0.005%–2.0% calculated as metal and based on the weight of the polymer, the preferred amount is about 0.02–1.0%. The preferred metals are manganese, cerium, iron, cobalt and copper. The preferred forms of metal compound are the organic salts and chelates. Obviously more than one metal compound may be used in a given composition if desirable.

The amount of amino nitrogen compound may be 0.1%–5.0% based on the weight of the polymer. The preferred amount is 1.0%–3.0%. The preferred amino nitrogen compounds are diphenyl guanidine, morpholine, diethanolamine, triethylenetetramine, and cyclohexyl amine.

A wide variety of volatile organic solvents may be used in formulating the coating compositions of this invention. The choice of solvent will depend on its cost, evaporation rate and solvency characteristics with respect to the particular polythiol polymer used. Examples of suitable solvents are toluene, xylene, cyclohexanone, dioxane, methyl ethyl ketone, methyl isobutyl ketone, ethyl acetate, butyl acetate, ethyl alcohol, butyl alcohol, monoethyl ether of ethylene glycol, monobutyl ether of ethylene glycol, monoethyl ether of diethylene glycol. In some instances it is desirable to have a small percentage of water present, in which case, the organic solvent should be miscible with the water.

While the several examples are directed to clear, unpigmented coating compositions in order to illustrate the most useful advantages of the synergistic accelerator compositions of this invention, the polythiol polymer coating compositions may be pigmented in conventional manner with inorganic pigments, organic pigments, dyes, fillers and extenders to provide colored and opaque finishes.

The polythiol polymer coating compositions may also be modified with other additives well known in the organic coating art, such as plasticizers, surface active agents, auxiliary curing agents such as peroxides, and other compatible film-forming materials.

Compositions of this invention may be applied by well known methods such as brushing, dipping, spraying and roller coating to a wide variety of substrates which may include wood, metal, glass, ceramics, masonry, paper, leather, textiles, felts and fabrics.

Although the invention is particularly directed to polythiol polymer coating compositions which are curable at room temperature, it also includes such compositions which can be cured conveniently by baking at relatively low baking temperatures, e. g. 100°–250° F.

It is obvious from the description of this invention that, through the use of the amino nitrogen compounds disclosed, it is now possible to prepare polythiol polymer coating compositions which cure quickly without having to use such high concentrations of metal driers that the products are objectionably colored and/or are susceptible to rapid bodying or gelation during storage.

It is apparent that many widely different embodiments of this invention may be made without departing from the spirit and scope thereof, and therefore it is not intended to be limited except as indicated in the appended claims.

I claim:

1. A liquid coating composition comprising a solution in a volatile organic solvent of (1) a polythiol polymer having at least three reactive thiol groups per molecule, the number of said thiol groups present being in the range of about 0.025–0.5 per carbon atom in the polymer chain of the molecule, (2) a metallic drier compound in an amount corresponding to 0.005%–2.0% of metal based on the weight of said polymer, and (3) 0.1%–5.0%, based on the weight of said polymer, of a basic amino nitrogen compound having 1–5 amino nitrogen atoms and 2–20 carbon atoms per molecule, said amino nitrogen compound being a member of the group consisting of alkyl primary and secondary amines, alkanol primary and secondary amines, N-alkyl N-alkanol tertiary amines, alkenyl primary and secondary amines, alkylene primary and secondary amines, cycloalkyl primary and secondary amines, aralkyl amines, N-aryl guanidines, morpholine, N-alkyl morpholines, dimethyl formamide, N,N'-disalicylalethylenediamine and N,N'-disalicylalorthophenylenediamine.

2. A product of claim 1 in which the polythiol polymer is a polysulfide polymer having reactive terminal and side chain thiol groups.

3. A product of claim 1 in which the polythiol polymer is a copolymer of methyl methacrylate and vinylthiol.

4. A product of claim 1 in which the polythiol polymer is a butadiene homopolymer having side chain thiol groups.

5. A product of claim 1 in which the metal of said metallic drier compound is manganese.

6. A product of claim 1 in which the metal of said metallic drier compound is cerium.

7. A product of claim 1 in which the metal of said metallic drier compound is iron.

8. A product of claim 1 in which the metal of said metallic drier compound is cobalt.

9. A product of claim 1 in which the metal of said metallic drier compound is copper.

10. A product of claim 1 in which said metallic drier compound is an organic salt.

11. A product of claim 1 in which said metallic drier compound is a chelate.

12. A product of claim 1 in which said metallic drier compound is an inorganic salt.

13. A product of claim 1 in which said amino nitrogen compound is diphenyl guanidine.

14. A product of claim 1 in which said amino nitrogen compound is morpholine.

15. A product of claim 1 in which said amino introgen compound is diethanolamine.

16. A product of claim 1 in which said amino nitrogen compound is triethylenetetramine.

17. A product of claim 1 in which said amino nitrogen compound is cyclohexyl amine.

18. A product of claim 1 also containing pigment.

References Cited in the file of this patent

UNITED STATES PATENTS

| | | |
|---|---|---|
| 2,466,963 | Patrick et al. | Apr. 12, 1947 |
| 2,633,458 | Shokal | Mar. 31, 1953 |

OTHER REFERENCES

"Thiokal" Liquid Polymer LP–2, published by Thiokol Corp., Trenton, New Jersey, October 13, 1947, page 13.